United States Patent [19]

Kimura et al.

[11] Patent Number: 5,672,223
[45] Date of Patent: Sep. 30, 1997

[54] METHOD OF RECYCLING IMAGE-DEPOSITED RECORDING MATERIAL, AND RECORDING MATERIAL FOR USE WITH THE RECYCLING METHOD

[75] Inventors: Shigeaki Kimura; Hiroshi Kitazawa, both of Mishima, Japan

[73] Assignee: Ricoh Company, Ltd., Tokyo, Japan

[21] Appl. No.: 603,085

[22] Filed: Feb. 16, 1996

[30] Foreign Application Priority Data

Feb. 17, 1995 [JP] Japan ................................. 7-053409

[51] Int. Cl.$^6$ ............................. B41M 5/40; B44C 1/165
[52] U.S. Cl. .......................... 156/234; 15/77; 156/230; 156/234; 427/140; 427/141; 428/195; 428/211; 428/409; 428/484; 428/488.1
[58] Field of Search .......................... 15/77; 156/230, 156/234; 427/140, 141; 428/195, 484, 488.1, 913, 914, 211, 409, 537.5

Primary Examiner—Bruce H. Hess
Attorney, Agent, or Firm—Oblon, Spivak, McClelland, Maier & Neustadt, P.C.

[57] ABSTRACT

A method of recycling an image-bearing recording material, at least part of a surface portion having a paper layer which contains cellulose fibers and bears thereon images formed by a thermofusible or thermosoftening ink, includes the steps of causing the image-bearing surface portion of the recording material to hold a water-containing image removal acceleration liquid thereon, and causing the images to adhere to an image releasing member with the application of heat and/or pressure to the images, whereby peeling the images away from the surface portion, with the surface portion of the recording material having a contact angle ($\cos\theta$) of −0.6 to 0.8 when a liquid with a surface tension of 40 mN/m is placed dropwise on the surface portion of the recording material.

6 Claims, No Drawings

METHOD OF RECYCLING IMAGE-DEPOSITED RECORDING MATERIAL, AND RECORDING MATERIAL FOR USE WITH THE RECYCLING METHOD

BACKGROUND OF THE INVENTION

1. Field of the Invention

The present invention relates to a method of recycling a recording material comprising at least a cellulose-fibers-containing paper layer which bears images thereon produced by use of a thermofusible or thermosoftening ink by removing the images therefrom. The present invention also relates to a recording material which can be recycled repeatedly from an image-bearing recording material by removing images formed by a thermofusible or thermosoftening ink therefrom.

2. Discussion of Background

Because a recent rapid development of office automation (OA), a large quantity of papers for printers and copying machines has been used and consumed. Therefore, considerable deforestation is being carried out, causing many problems with respect to the environmental disruption of the earth.

As a countermeasure against the problem of the environmental disruption of the earth due to deforestation, conventionally, papers have been recycled by removing printed ink from used papers to obtain ink-free paper, pulping the ink-free paper and making paper therefrom so as to be used again.

However, recently, there have been developed a recyclable recording material, and a method recycling used copy papers by merely cleaning printed images off the surface of the copy papers so that they can be successively used for making copies or recording.

Examples of such a recycling method have been described, for instance, in the following references: (1) Japanese Laid-Open Patent Application 4-67043:

In this reference, there is proposed a sheet-shaped recording material with one surface side thereof being treated so as to be made image-releasable with application of releasing agent. In this recording material, a special mark is placed in order to distinguish it from ordinary plain paper.

This recording material, however, has the following drawbacks:

(a) Since this recording material is a special surface-treated copy sheet, it cannot be used in the same manner as in conventional copy papers and printing papers which are currently used in a large quantity.

(b) Therefore, it is difficult to use this surface-treated copy sheet together with conventional copy papers in general use.

(c) In view of the significance of recycling resources, duplex copies which bear images on both sides thereof are useful and will be used mainly in the future. Under such circumstances, however, there will be difficulties in recycling copy papers with a releasing agent being applied to one side thereof.

(2) Japanese Laid-Open Paten Applications 1-101576 and 1-101577:

In these references, there are proposed methods of recycling recording materials which bear toner images thereon. Namely, in these methods, a toner-image-bearing recording material is immersed into an organic solvent in which a resin contained in the toner images is soluble, and is then subjected to an ultrasonic wave treatment, thereby removing toner images from the recording material. These methods, however, have the shortcomings that the organic solvents used in these methods cause air pollution problems and are ignitable and toxic, accordingly not suitable for office or home use.

(3) Japanese Laid-Open Patent Application 1-297294:

In this reference, there is disclosed a method of cleaning the images deposited on a recording material. In this reference, there is used a recording material made of plastics, metals, papers into which liquids hardly penetrate, or ceramics materials, which is in the form of an erasable sheet with an image-bearing-surface side thereof being treated so as to be image-erasable.

Images formed on such a recording material can be peeled away from the recording material by heating the images through a thermofusible image releasing member, whereby the surface of the recording material can be cleaned. In this method, however, the above-mentioned special image-erasable recording material must be use. Copy papers and printing papers now in general use in a large quantity cannot be applied to this recycling method.

To solve the above-mentioned conventional problems, there has been proposed a method of recycling a recording material, at least part of which comprises a paper layer comprising cellulose fibers and bearing thereon deposited images produced by use of a thermofusible or thermosoftening ink. According to this recycling method, a water-containing image removal acceleration liquid is applied to an image-bearing recording material, and images are caused to adhere to an image releasing member, whereby images are peeled away from the image-bearing recording material.

This is an effective recycling method since images can be peeled away from the recording material without impairing the recording material, and copy papers and printing papers now in general use can be applied to this recycling method without any environmental problems. However, it is not always possible to securely peel the images from any kind of recording material. Namely, the drawback of the above-mentioned recycling method is that image removal may become unsatisfactory according to the kid of recording material.

SUMMARY OF THE INVENTION

It is therefore a first object of the present invention to provide a method of recycling an image-bearing recording material, capable of removing the images deposited on the recording material therefrom securely and completely.

A second object of the present invention is to provide a recording material capable of bearing images thereon and being repeatedly used by removing the images therefrom.

The above-mentioned first object of the present invention can be achieved by a method recycling an image-bearing recording material comprising a surface portion, at least part of which comprises a paper layer comprising cellulose fibers and bearing thereon images formed by a thermofusible or thermosoftening ink, comprising the steps of causing the image-bearing surface portion of the recording material to hold a water-containing image removal acceleration liquid thereon, and causing the images to adhere to an image releasing member with the application of heat and/or pressure to the images, whereby peeling the images away from the surface portion, with the surface portion of the recording material having a contact angle ($\cos\theta$) in the range of −0.6 to 0.8 when a liquid with a surface tension of 40 mN/m is placed dropwise on the surface portion of the recording material.

In the above-mentioned recycling method, it is preferable that the paper layer of the recording material comprise a sizing agent having a contact angle (cosθ) in the range of −0.6 to 0.8 when a liquid with a surface tension of 40 mN/m is placed dropwise on a film prepared by drying the sizing agent. In this case, such a sizing agent may be internally added to the paper layer of the recording material, or externally added to the surface portion of the recording material.

The second object of the present invention can be achieved by a recording material comprising a surface portion, at least part of which comprises a paper layer comprising cellulose fibers and capable of bearing thereon images formed by a thermofusible or thermosoftening ink, with the image-bearable surface portion of the recording material having a contact angle (cosθ) in the range of −0.6 to 0.8 when a liquid with a surface tension of 40 mN/m is placed dropwise on the surface portion of the recording material.

In the above-mentioned recording material, it is also preferable that a sizing agent which has a contact angle (cosθ) of −0.6 to 0.8 when a liquid with a surface tension of 40 mN/m is placed dropwise on a film of the sizing agent prepared by drying be internally added to the paper layer of the recording material, or externally applied to the surface portion of the recording material.

DESCRIPTION OF THE PREFERRED EMBODIMENTS

The inventors of the present invention have paid attention to the fact that the releasability of images from the image-bearing recording material varies according to the kind of recording material, and examined the difference in properties between an image-bearing recording material from which images can be easily peeled and an image-bearing recording material from which images cannot be easily peeled.

As a result, the present invention has been accomplished based on the discovery that the wettability of the surface portion of the recording material which comprises the cellulose-fibers-containing paper layer has a relationship to the releasability of the images from the surface portion of the recording material.

According to the present invention, there is provided a method of recycling an image-bearing recording material comprising a surface portion, at least part of which comprises a paper layer comprising cellulose fibers and bearing thereon images formed by a thermofusible or thermosoftening ink, comprising the steps of causing the image-bearing surface portion of the recording material to hold a water-containing image removal acceleration liquid thereon, and causing the images to adhere to an image releasing member with the application of heat and/or pressure to the images, whereby peeling the images away from the surface portion. The above-mentioned recycling method is characterized in that the surface portion of the recording material has a contact angle (cosθ) in the range of −0.6 to 0.8 when a liquid with a surface tension of 40 mN/m is placed dropwise on the surface portion of the recording material.

In the present invention, the contact angle of the surface portion of the recording material with respect to a liquid is measured in the following manner: One drop of a wettability standard solution with a surface tension of 40 mN/m (made by Wako Pure Chemical Industries, Ltd.) is placed on the surface portion of the recording material using a microsyringe of a commercially available contact angle measuring instrument (Trademark "CA-D", made by Kyowa Interface Science Co., Ltd.) under the circumstances of 23° C. and 50% RH. Five seconds later, the contact angle between the recording material and the solution is read by using the same contact angle measuring instrument as mentioned above.

To control the contact angle (cosθ) of the surface portion of the recording material to −0.6 to 0.8 with respect to the standard solution having a surface tension of 40 mN/m, a variety of internal sizing agents and surface sizing agents generally used in the course of paper making process may be used. To be more specific, it is preferable that a sizing agent having a contact angle (cosθ) of −0.6 to 0.8 when a liquid with a surface tension of 40 mN/m is placed dropwise on a film prepared by drying the sizing agent be internally added to the paper layer of the recording material, or externally applied to the surface portion of the recording material.

In the above description, the film of a sizing agent is prepared by thoroughly washing a slide glass, immersing the slide glass in a stock solution of a sizing agent, taking the slide glass out of the solution of the sizing agent, and drying it at room temperature, and then, in a temperature controlled bath of 105° C. for 5 minutes. Thus, a film of the sizing agent is formed on the slide glass. Then, the contact angle of the film of the sizing agent with the wettability standard solution with a surface tension of 40 mN/m (made by Wako Pure Chemical Industries, Ltd.) may be measured in the same manner as previously mentioned.

Even if a sizing agent is contained in the surface portion of the recording material, it is considerably difficult to control the contact angle (cosθ) of the surface portion of the recording material to −0.6 to 0.8 with respect to the standard solution having a surface tension of 40 mN/m as long as the contact angle (cosθ) of the employed sizing agent is not in the range of −0.6 to 0.8 with respect to the solution having a surface tension of 40 mN/m.

The optimum sizing agent used for the recording material of the present invention is, for example, an alkyl ketene dimer sizing agent. In addition to this, synthetic sizing agents such as a styrene sizing agent and an olefin sizing agent can be employed. Examples of the commercially available synthetic sizing agent are "AK" (Trademark), made by Misawa Ceramic Chemical Co., Ltd., and "KN" (Trademark), made by Harima Chemicals, Inc.

The sizing agent is added to paper by various methods. For example, the sizing agent is internally added to the paper material in the paper machine; or externally added to the paper material by surface sizing using a size press apparatus and a coater, or tub sizing. In the present invention, to obtain the previously mentioned value of the contact angle (cosθ), it is effective that the amount of the sizing agent on the surface portion of the recording material be sufficient enough. Therefore, it is preferable that the sizing agent be added to the recording material by surface sizing or tub sizing rather than internal sizing.

The recording material of the present invention basically comprises a surface portion, at least part of which comprises a paper layer mainly comprising cellulose fibers. Therefore, the recording material of the present invention can be applied to a copy paper, printing paper, recording paper for general use.

To form the images on the recording material of the present invention, many methods are usable. For example, images can be formed on the recording material using a developer comprising as the main components a coloring agent and a thermosoftening resin by electrophotographic process; using a thermal transfer ink layer comprising as the main components a coloring agent and thermofusible polymeric material by thermal transfer process; and using an ink composition comprising as the main components a coloring agent and a thermosoftening or thermofusible material by ink-jet process. In particular, when the images are produced on the recording material with a thermosoftening ink by the electrophotographic process, the releasability of the images from the recording material is excellent in the present invention.

Preferable examples of the image removal acceleration liquid for use with the recycling method of the present invention are water, an aqueous solution containing a surfactant, an aqueous solution containing a water-soluble polymer, and an aqueous solution containing a surfactant and a water-soluble polymer.

The surfactant is preferably used in the image removal acceleration liquid for use in the present invention because the images can be peeled away from the recording material securely and speedily. To be more specific, when the surfactant is contained in the image removal acceleration liquid, a sufficient amount of the water-containing image removal acceleration liquid can be caused to rapidly penetrate into a contact portion between the deposited images and the cellulose-fibers-containing surface portion of the recording material.

Examples of the above-mentioned surfactant for use in the present invention are conventional surfactants such as an anionic surfactant, cationic surfactant, amphoteric surfactant, and nonionic surfactant, and fluorochemical surfactants.

Examples of the anionic surfactant for use in the image removal acceleration liquid include carboxylates, sulfonates, sulfuric ester salts, phosphoric ester salts and phosphonic acid salts.

Examples of the cationic surfactant include amine salts, quaternary ammonium salts, benzalkonium salts, benzethonium chloride, pyridinium salts, imidazolinium salts, sulfonium salts, and polyethylene polyamine.

Examples of the amphoteric surfactant include amino acid, carboxy betaine, sulfobetaine, aminosulfates, aminocarboxylates, and imidazoline derivatives.

Examples of the nonionic surfactant include ether-based surfactants, ether-ester-based surfactants, ester-based surfactants, nitrogen-containing surfactants, polyols, aminoalcohols, polyethylene glycols.

It is preferable that the amount of any of the above surfactants be in the range of 0.01 to 20 wt. %, more preferably in the range of 0.01 to about 5 wt. % of the total weight of the aqueous solution.

Examples of the water-soluble polymer for use in the image removal acceleration liquid include natural polymers, for example, starches such as sugar cane starch, potato starch, tapioca starch, wheat starch and corn starch, mannan such as konnyaku, marine algae such as glue plant, agar and sodium alginate, plant mucilage such as hibiscus, tragacanth gum and gum arabic, microorganism mucilage such as dextran and levan, and protein such as glue, gleatin, casein and collagen; cellulose-based semisynthetic or synthetic polymers such as viscose, methyl cellulose, ethyl cellulose, hydroxyethyl cellulose and carboxymethyl cellulose; and starch-based semisynthetic or synthetic polymers such as soluble starches, carboxymethyl starch and dialdehyde starch.

It is preferable that the amount of any of the water-soluble polymers be in the range of 0.01 to 20 wt. %, more preferably in the range of 0.01 to about 5 wt. % of the total weight of the aqueous solution.

The image releasing member used for the recycling method of the present invention may be made from various organic polymers such as resin and rubbers, or metals such as aluminum and nickel, in the form of a sheet, a belt or a roller, or in any other forms so as to be supported on the surface of a support member.

Other features of this invention will become apparent in the course of the following description of exemplary embodiments, which are given for illustration of the invention and are not intended to be limiting thereof.

EXAMPLE 1

0.4 parts by weight of a polyamide epichlorohydrin resin (Trademark "WS-570", made by Nippon Pneumatic Mfg. Co., Ltd.) and 6.0 parts by weight of a polyacrylamide resin (Trademark "POLYSTRON-117", made by Arakawa Chemical Industries, Ltd.) were internally added to 100 parts by weight of a broadleaf kraft pulp (LBKP) refined with a Canadian standard freeness of 400 ml.

A recording material No. 1 with a basis weight of 74 g/m$^2$ according to the present invention was prepared from the above-mentioned two resins containing pulp as the pulp was subjected to surface sizing by a size press apparatus of a Fourdrinier paper machine, using oxidized starch (Trademark "MS#3800", made by Nihon Shokuhin Kako Co., Ltd.) in an application amount of 1 g/m$^2$, polyvinyl alcohol (Trademark "PVA117", made by Kuraray Co., Ltd.) in an application amount of 0.7 g/m$^2$, a polyamide epichlorohydrin resin (Trademark "WS-525", made by Nippon Pneumatic Mfg., Ltd.) in an application amount of 0.4 g/m$^2$, and an alkyl ketene dimer sizing agent (Trademark "AS-202", made by Nippon Pneumatic Mfg., Ltd.) in an application amount of 0.9 g/m$^2$.

The contact angle (cosθ) of the surface portion of the above prepared recording material No. 1 was 0.0 when a liquid with a surface tension of 40 mN/M was placed dropwise on the surface portion of the recording material No. 1.

In addition, the previously mentioned alkyl ketene dimer sizing agent (Trademark "AS-202", made by Nippon Pneumatic Mfg., Ltd.) employed for surface sizing was thinly spread on a slide glass and dried to prepare a film of the alkyl ketene dimer sizing agent. The contact angle (cosθ) of the film of the sizing agent was −0.5 when a liquid with a surface tension of 40 mN/m was placed dropwise on the surface of the film.

Solid images and character images were formed on the recording material No. 1 by use of a commercially available plain paper copying machine (Trademark "IMAGIO 320 FPT", made by Richoh Company, Ltd.).

The thus prepared toner-image-bearing recording material was immersed in a water-containing image removal acceleration liquid comprising of 0.8 wt. % of an anionic surfactant of sodium dihexylsulfosuccinate (Trademark "MA-80", made by Mitsui Cytec, Ltd.). Then, the recording material was caused to pass through a nip of two rubber rollers, with the wet toner-image-bearing surface of the recording material being brought into contact with an image releasing member. When the image releasing member was separated from the recording material, the images were transferred to the image releasing member, so that the images were peeled away from the recording material.

The density of a portion of the recording material from which the image had been removed by the above-mentioned method, and the density of a background portion of the recording material where no image was originally formed were measured by use of a Mcbeth reflection-type densitometer. The density of the recording material after image removal was expressed by the difference between the above-mentioned two densities. In addition, it was visually observed whether the character images formed on the recording material were remaining or not after image removal. The results are shown in Table 1.

EXAMPLE 2

The procedure for preparation of the recording material No. 1 according to the present invention in Example 1 was repeated except that the alkyl ketene dimer sizing agent (Trademark "AS-202", made by Nippon Pneumatic Mfg., Ltd.) used for surface sizing in Example 1 was replaced by an olefin sizing agent (Trademark "AK-300", made by Misawa Ceramic Chemical Co., Ltd.), and that the polyamide epichlorohydrin resin (Trademark "WS-525", made by Nippon Pneumatic Mfg., Ltd.) used for surface sizing in Example 1 was replaced by a glyoxal (made by The Nippon Synthetic Chemical Industry Co., Ltd.).

Thus a recording material No. 2 according to the present invention was prepared.

The contact angle ($\cos\theta$) of the recording material No. 2, and that of the film of the employed sizing agent were measured using a liquid with a surface tension of 40 mN/m in the same manner as in Example 1. The results are shown in Table 1.

On this recording material No. 2, toner images were formed and removed therefrom by the same method as in Example 1.

The density of the recording material No. 2 after image removal was obtained in the same manner as described in Example 1.

The results are shown in Table 1.

EXAMPLE 3

The procedure for preparation of the recording material No. 2 according to the present invention in Example 2 was repeated except that the olefin sizing agent (Trademark "AK-400", made by Misawa Ceramic Chemical Co., Ltd.) used for surface sizing in Example 2 was replaced by an acrylic sizing agent (Trademark "KN-800", made by Harima Chemicals, Inc.).

Thus, a recording material No. 3 according to the present invention was prepared.

The contact angle ($\cos\theta$) of the recording material No. 3, and that of the film of the employed sizing agent were measured using a liquid with a surface tension of 40 mN/m in the same manner as in Example 1. The results are shown in Table 1.

On this recording material No. 3, toner images were formed and removed therefrom by the same method as in Example 1.

The density of the recording material No. 3 after image removal was obtained in the same manner as describe in Example 1.

The results are shown in Table 1.

EXAMPLE 4

0.4 parts by weight of a polyamide epichlorohydrin resin (Trademark "WS-570", made by Nippon Pneumatic Mfg. Co., Ltd.), 1.0 part by weight of a polyacrylamide resin (Trademark "POLYSTRON-117", made by Arakawa Chemical Industries, Ltd.) and 0.5 parts by weight of an alkyl ketene dimer sizing agent (Trademark "AS-202", made by Nippon Pneumatic Mfg., Ltd.) were internally added to 100 parts by weight of a broadleaf kraft pulp (LBKP) refined with a Canadian standard freeness of 400 ml.

A recording material No. 4 with a basis weight of 74 g/m$^2$ according to the present invention as prepared from the above-mentioned two resins and sizing agent containing pulp as the pulp was subjected to surface sizing by a size press apparatus of a Fourdrinier paper machine, using oxidized starch (Trademark "MS#3800", made by Nihon Shokuhin Kako Co., Ltd.) in an application amount of 1 g/m$^2$, polyvinyl alcohol (Trademark "PVA117", made by Kuraray Co., Ltd.) in an application amount of 0.7 g/m$^2$, a polyamide epichlorohydrin resin (Trademark "WS-525", made by Nippon Pneumatic Mfg., Ltd.) in an application amount of 0.4 g/m$^2$, and an alkyl ketene dimer sizing agent (Trademark "AS-202", made by Nippon Pneumatic Mfg., Ltd.) in an application amount of 0.5 g/m$^2$.

The contact angle ($\cos\theta$) of the recording material No. 4, and that of the film of the employed sizing agent were measured using a liquid with a surface tension of 40 mN/m in the same manner as in Example 1. The results are shown in Table 1.

On this recording material No. 4, toner images were formed and removed therefrom by the same method as in Example 1.

The density of the recording material No. 4 after image removal was obtained in the same manner as described in Example 1.

The results are shown in Table 1.

COMPARATIVE EXAMPLE 1

The procedure for preparation of the recording material No. 1 according to the present invention in Example 1 was repeated except that the alkyl ketene dimer sizing agent (Trademark "AS-202", made by Nippon Pneumatic Mfg., Ltd.) used for surface sizing in Example 1 was replaced by a styrene sizing agent (Trademark "POLYMARON-360", made by Arakawa Chemical Industries, Ltd.).

Thus a comparative recording material No. 1 was prepared.

The contact angle ($\cos\theta$) of the comparative recording material No. 1, and that of the film of the employed sizing agent were measured using a liquid with a surface tension of 40 mN/m in the same manner as in Example 1. The results are shown in Table 1.

On this comparative recording material No. 1 toner images were formed and removed therefrom by the same method as in Example 1.

The density of the comparative recording material No. 1 after image removal was obtained in the same manner as described in Example 1.

The results are shown in Table 1.

COMPARATIVE EXAMPLE 2

The procedure for preparation of the recording material No. 2 according to the present invention in Example 2 was repeated except that the olefin sizing agent (Trademark "AK-400", made by Misawa Ceramic Chemical Co., Ltd.) used for surface sizing in Example 2 was replaced by a styrene sizing agent (Trademark "S-810", made by Misawa Ceramic Chemical Co., Ltd.). Thus, a comparative recording material No. 2 was prepared.

The contact angle ($\cos\theta$) of the comparative recording material No. 2, and that of the film of the employed sizing agent were measured using a liquid with a surface tension of 40 mN/m in the same manner as in Example 1. The results are shown in Table 1.

On this comparative recording material No. 2, toner images were formed and removed therefrom by the same method as in Example 1.

The density of the comparative recording material No 2 after image removal was obtained in the same manner as described in Example 1. The results are shown in Table 1.

COMPARATIVE EXAMPLE 3

The procedure for preparation of the recording material No. 2 according to the present invention in Example 2 was repeated except that the olefin sizing agent (Trademark "AK-400", made by Misawa Ceramic Chemical Co., Ltd.) used for surface sizing in Example 2 was replaced by a styrene sizing agent (Trademark "KN-500", made by Harima Chemicals, Inc.).

Thus, a comparative recording material No. 3 was prepared.

The contact angle (cosθ) of the comparative recording material No. 3, and that of the film of the employed sizing agent were measured using a liquid with a surface tension of 40 mN/m in the same manner as in Example 1. The results are shown in Table 1.

On this comparative recording material No. 3, toner images were formed and removed therefrom by the same method as in Example 1.

The density of the comparative recording material No. 3 after image removal was obtained in the same manner as described in Example 1.

The results are shown in Table 1.

COMPARATIVE EXAMPLE 4

The procedure for preparation of the recording material No. 2 according to the present invention in Example 2 was repeated except that the olefin sizing agent (Trademark "AK-400", made by Misawa Ceramic Chemical Co., Ltd.) used for surface sizing in Example 2 was replaced by a styrene sizing agent (Trademark "AK-600", made by Misawa Ceramic Chemical Co., Ltd.).

Thus, a comparative recording material No. 4 was prepared.

The contact angle (cosθ) of the comparative recording material No. 4, and that of the film of the employed sizing agent were measured using a liquid with a surface tension of 40 mN/M in the same manner as in Example 1. The results are shown in Table 1.

On this comparative recording material No. 4, toner images were formed and removed therefrom by the same method as in Example 1.

The density of the comparative recording material No. 4 after image removal was obtained in the same manner as described in Example 1.

The results are shown in Table 1.

TABLE 1

|  | Contact Angle (cosθ) of Recording Material | Contact Angle (cosθ) of Film of Sizing Agent | I.D. of Recording Material after Image Removal | Removal Degree of Character Images after Image Removal |
|---|---|---|---|---|
| Ex. 1 | 0.0 | −0.5 | 0.008 | No image was remaining. |
| Ex. 2 | 0.7 | 0.7 | 0.011 | No image was remaining. |
| Ex. 3 | 0.6 | 0.5 | 0.011 | No image was remaining. |
| Ex. 4 | 0.0 | 0.9 | 0.010 | No image was remaining. |
| Comp. Ex. 1 | 0.9 | 0.8 | 0.018 | Remaining character images were exactly legible. |
| Comp. Ex. 2 | 0.9 | 0.9 | 0.016 | Remaining character images were anyhow legible. |
| Comp. Ex. 3 | 0.9 | 0.9 | 0.020 | Remaining character images were anyhow legible. |
| Comp. Ex. 4 | 1.0 | 1.0 | 0.024 | Remaining character images were anyhow legible |

As is apparent from the results shown in Table 1, when toner images formed on the recording material of the present invention are removed therefrom by the method of recycling the image-bearing recording material according to the present invention, the toner images can be securely and completely peeled away from the recording material. Thus, the recording material of the present invention can be repeatedly recycled for image formation.

Japanese Patent Application No. 7-053409 filed Feb. 17, 1995 is hereby incorporated by reference.

What is claimed is:

1. A method of recycling an image-bearing recording material comprising a surface portion, at least part of which comprises a paper layer comprising cellulose fibers and bearing thereon images formed by a thermofusible or thermosoftening ink, comprising the steps of:

causing said image-bearing surface portion of said recording material to hold a water-containing image removal acceleration liquid thereon, and causing said images to adhere to an image releasing member with the application of heat and/or pressure to said images, thereby peeling said images away from said surface portion, with said surface portion of said recording material having a contact angle (cosθ) in the range of −0.6 to 0.8 when a liquid with a surface tension of 40 mN/m is placed dropwise on said surface portion of said recording material, and wherein said surface portion of said recording material comprises a sizing agent having a contact angle (cosθ) of −0.6 to 0.8 when a liquid with a surface tension of 40 mN/m is placed dropwise on a film prepared by drying said sizing agent.

2. The method of recycling an image-bearing recording material a claimed in claim 1, wherein said sizing agent is internally added to said paper layer.

3. The method of recycling an image-bearing recording material as claimed in claim 1, wherein said sizing agent is applied to said surface portion of said recording material.

4. A recording material comprising a surface portion, at least part of which comprises a paper layer comprising cellulose fibers and capable of bearing thereon images formed by a thermofusible or thermosoftening ink, with said image-bearable surface portion of said recording material having a contact angle (cosθ) in the range of −0.6 to 0.8 when a liquid with a surface tension of 40 mN/m is placed dropwise on said surface portion of said recording material, and wherein said surface portion of said recording material comprises a sizing agent having a contact angle (cosθ) of −0.6 to 0.8 when a liquid with a surface tension of 40 mN/m is placed dropwise on a film prepared by drying said sizing agent.

5. The recording material as claimed in claim 4, wherein said sizing agent is internally added to said paper layer.

6. The recording material as claimed in claim 4, wherein said sizing agent is applied to said surface portion of said recording material.

* * * * *

UNITED STATES PATENT AND TRADEMARK OFFICE
CERTIFICATE OF CORRECTION

PATENT NO. : 5,672,223
DATED : September 30, 1997
INVENTOR(S) : Shigeaki KIMURA ET AL It is certified that error appears in the above-identified patent and that said Letters Patent is hereby corrected as shown below:

Column 2, line 18, "use" should read --used--.
    line 39, "kid" should read --kind--.

Column 7, line 15, " "AK-300" " should read --"AK-400"--.

Column 9, line 58, "mN/M" should read --mN/m--.

Column 10, line 66, Claim 2, "a claimed" should read --as claimed--.

Signed and Sealed this

Thirtieth Day of June, 1998

Attest:

BRUCE LEHMAN

Attesting Officer

Commissioner of Patents and Trademarks